United States Patent Office 2,734,465
Patented Feb. 14, 1956

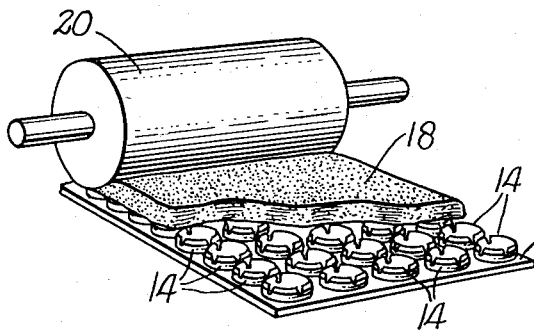
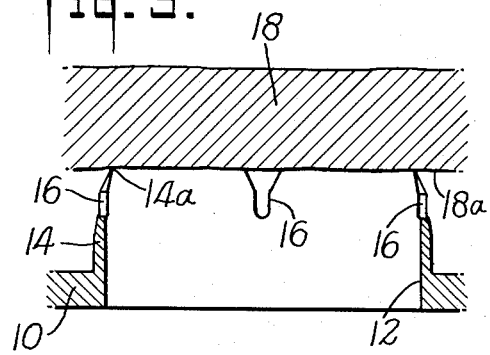
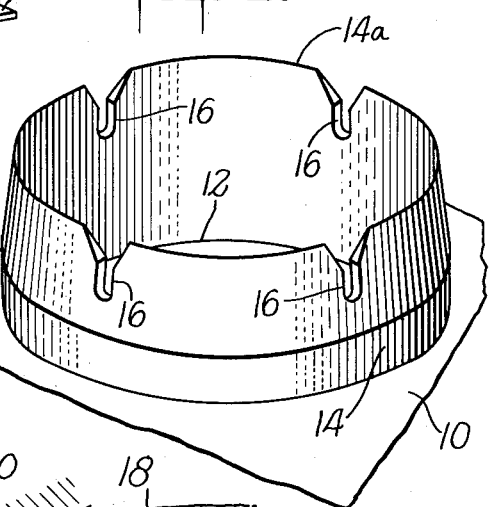
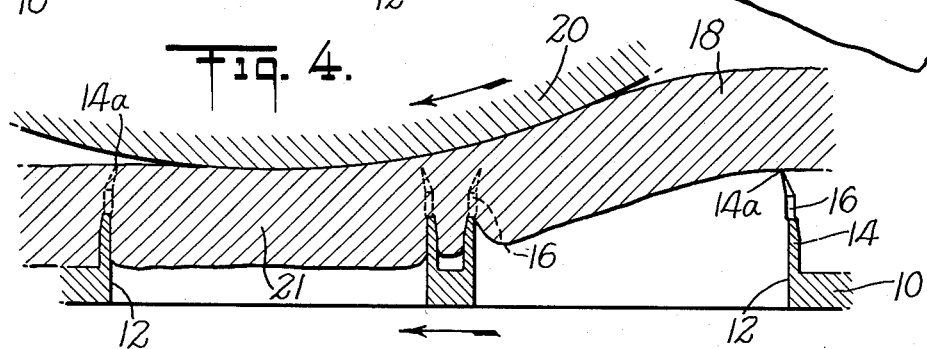
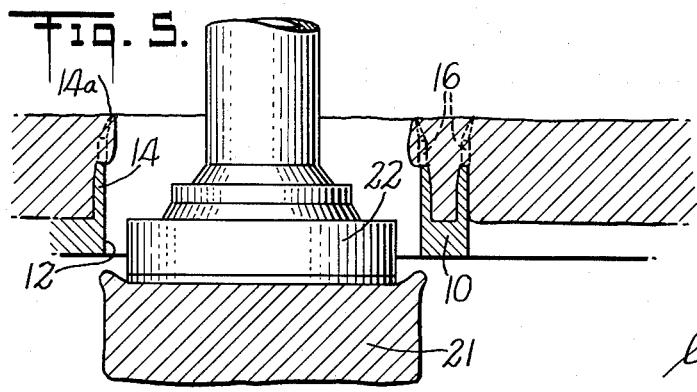

2,734,465

CUTTING AND HANDLING DOUGH

Carl T. Head, Marysville, Ind., assignor, by mesne assignments, to Pillsbury Mills, Inc., a corporation of Delaware Application April 6, 1950, Serial No. 154,404

1 Claim. (Cl. 107—54)

This invention relates to cutting and handling dough and more specifically to a method for dividing a sheet of dough into separate blanks such as biscuit blanks, and for temporarily retaining and supporting the blanks thus formed.

In the division of a sheet of dough into blanks suitable for baking, it is frequently desirable to form the dough blanks at a different time or different place than that at which the blanks are transferred to a packing container or to a tray for baking. For example, in the co-pending application of Lowell Armstrong, Lively B. Willoughby, Rogers C. B. Morton and Harlan How, Serial No. 143,428 filed February 10, 1950, now Patent No. 2,664,833, dated January 5, 1954, there is disclosed a machine for forming and packing blanks of dough such as the prepared biscuits which are transported under refrigeration for sale in a ready-to-bake condition. In that machine, the sheet of dough is fed to a conveyor belt having formed thereon a plurality of upstanding, open, tubular cutters. The moving conveyor passes under a roller which presses the sheet of dough down onto the cutters to form biscuit blanks within the cutters. The conveyor then carries the biscuit blanks forward into position over one or more rows of tubular cans where a group of plungers moves downwardly through the cutters to press the blanks from the cutters into the cans below. It is of course necessary in such a device to support the biscuit blanks in the cutter belt during the movement of the cutter belt from the point of contact with the roller, at which point the blanks are formed within the cutters, to the point at which the plungers press the blanks from the cutters into the cans.

The present invention preferably utilizes a device having a plurality of tubular cutter elements thereon, each of said cutter elements having one or more discontinuities in its cutting edge so that the dough blank formed within the cutter remains connected to the sheet of dough by the portions of dough at the discontinuities and the blank is thereby supported pending ultimate transfer from the device.

In the drawing:

Figure 1 is a perspective view showing a device of the type preferably utilized in the method of the present invention during the cutting operation;

Figure 2 is an enlarged perspective view of one of the cutter elements of the device shown in Figure 1;

Figure 3 is a vertical section through one of the cutter elements of the device, showing a sheet of dough in position thereon prior to cutting;

Figure 4 is a vertical section through the device during the cutting operation, showing the cooperating roller above pressing the sheet of dough onto the cutter elements; and, Figure 5 is a view similar to Figure 4 showing one of the dough blanks being pressed from the device by a plunger.

As shown in Figure 1, the device utilized in the practice of the invention comprises a supporting plate 10 having a plurality of openings 12 (see Figure 3) therein. Surrounding each of the openings 12 is an upstanding tubular cutter 14 having a sharpened upper cutting edge 14a. The cutting edge 14a is relieved by four notches 16, and is accordingly discontinuous.

In the use of the device, as illustrated in Figure 1, a sheet of dough 18, of a thickness generally equalling the thickness of the desired biscuit blanks and of a size approximating the size of the supporting plate 10, is laid over the device, with its under surface 18a (see Figure 3) resting upon the cutting edges 14a of the cutters 14.

A cylindrical roller 20 is then passed over the device, with the under surface of the roller, engaging the cutting surfaces 14a of the cutters 14, as shown in Figure 4. It may be seen in this figure that, as the roller 20 moves across the device, the dough is pressed downwardly onto the cutters 14 with the cutting edges 14a of the cutters dividing the dough to form within each cutter a circular blank of dough. However, due to the notches or discontinuities 16 in the cutting edges 14a of the cutters 14, each biscuit blank remains connected to the remainder of the sheet of dough 18 by the ligaments of dough within the notches 16, which are left uncut by the cutting edges 14a. Thus, the blanks of dough do not fall through the openings 12, but are supported in the cutters during the movement of the device to the point at which the biscuit blanks are transferred to packing containers or baking trays.

When it is desired to transfer the dough blanks from the device, downward pressure on the blanks readily severs the ligaments of dough connecting the blanks to the remainder of the sheet of dough. This is illustrated in Figure 5, wherein a circular plunger 22 is shown moving downwardly to press one of the blanks 21 from the device.

As many possible embodiments may be made of the above invention, and as many changes may be made in the embodiment above set forth, it is to be understood that all matter hereinfore set forth or shown in the accompanying drawing is to be interpreted as illustrative only and not in a limiting sense.

I claim:

The method of forming and supporting bodies of bread dough which comprises forming said dough into a sheet, cutting said sheet along a plurality of peripheral lines each outlining one of said bodies, said lines being spaced from one another to leave a sheet of scrap dough extending continuously around and between said bodies and each of said lines having one or more discontinuities therein to leave said bodies connected to said sheet of scrap dough by one or more uncut ligaments of dough, supporting said sheet of scrap dough from beneath while leaving said dough bodies unsupported except by said ligaments, and pressing said dough bodies downwardly to sever said ligaments and separate said dough bodies from said sheet of scrap dough.

References Cited in the file of this patent

UNITED STATES PATENTS

| Number | Name | Date |
|---|---|---|
| 339,972 | Crane et al. | Apr. 13, 1886 |
| 1,147,380 | Devine | July 29, 1915 |
| 1,492,607 | Rosenwasser | May 6, 1924 |
| 2,165,394 | Lyness | July 11, 1939 |
| 2,386,993 | Valdastri | Oct. 16, 1945 |
| 2,526,811 | Dawson | Oct. 24, 1950 |
| 2,664,833 | Armstrong et al. | Jan. 5, 1954 |